(12) United States Patent
Gillespie

(10) Patent No.: US 6,684,558 B1
(45) Date of Patent: Feb. 3, 2004

(54) DOWNRIGGER

(76) Inventor: Daniel G. Gillespie, 2434 N. White Pine, Flagstaff, AZ (US) 86004

( * ) Notice: Subject to any disclaimer, the term of this patent is extended or adjusted under 35 U.S.C. 154(b) by 0 days.

(21) Appl. No.: 10/140,114

(22) Filed: May 8, 2002

(51) Int. Cl.[7] ............................................... A01K 91/08
(52) U.S. Cl. ......................... 43/27.4; 43/43.12; 43/26.1
(58) Field of Search ........................ 43/4, 27.4, 43.12, 43/26.1, 21.2; 374/110, 136, 208, 209; 73/291, 292, 299, 300; 242/390.8, 390.9, 913; 248/289.11, 291.1, 292.12

(56) References Cited

U.S. PATENT DOCUMENTS

| | | | |
|---|---|---|---|
| 1,409,328 A | * 3/1922 | Wolfe | 242/390.8 |
| 2,709,867 A | 6/1955 | Routh | 43/26.1 |
| 3,628,274 A | * 12/1971 | Wojahn | 43/43.12 |
| 3,719,331 A | * 3/1973 | Harsch | 242/390.8 |
| 3,785,079 A | * 1/1974 | Rohn | 43/43.12 |
| 3,808,731 A | * 5/1974 | Lowrance | 43/4 |
| 3,835,571 A | 9/1974 | Berry | 43/43.12 |
| 3,910,524 A | 10/1975 | Ireland | 43/43.12 |
| 3,937,415 A | * 2/1976 | Prinz | 43/27.4 |
| 3,968,587 A | 7/1976 | Kammeraad | 43/27.4 |
| 4,000,653 A | * 1/1977 | Booth et al. | 374/136 |
| 4,004,366 A | * 1/1977 | Berry | 43/27.4 |
| 4,044,489 A | * 8/1977 | Henze et al. | 43/27.4 |
| 4,050,180 A | * 9/1977 | King | 43/27.4 |
| 4,104,917 A | * 8/1978 | Rieth et al. | 374/136 |
| 4,156,320 A | * 5/1979 | Kammeraad | 43/27.4 |
| 4,191,340 A | * 3/1980 | Kubanek | 43/4 |
| 4,273,973 A | 6/1981 | Bruins et al. | 242/390.8 |
| 4,617,752 A | 10/1986 | Seres | 43/27.4 |
| 4,667,892 A | * 5/1987 | Pease | 43/27.4 |
| 4,713,967 A | * 12/1987 | Overs et al. | 374/136 |
| 4,807,386 A | * 2/1989 | Emory, Jr. | 43/27.4 |
| 4,877,330 A | * 10/1989 | Torre | 374/136 |
| 4,899,480 A | * 2/1990 | Park | 43/4 |
| 4,948,083 A | * 8/1990 | McNaney, Jr. et al. | 43/21.2 |
| 4,974,358 A | 12/1990 | King et al. | 43/26.1 |
| 5,115,593 A | 5/1992 | Keough | 43/43.12 |
| 5,782,033 A | * 7/1998 | Park et al. | 43/4 |
| 5,834,641 A | * 11/1998 | Sternal | 43/4 |
| 6,091,443 A | 7/2000 | Ford et al. | 43/17 |
| 6,122,852 A | 9/2000 | Mechling, IV | 43/4 |

* cited by examiner

*Primary Examiner*—Darren W. Ark
(74) *Attorney, Agent, or Firm*—Jacobson Holman PLLC

(57) ABSTRACT

A downrigger including a downrigger line and weight supported from a motor powered reel associated with a fishing line and fishing rod with a releasable interconnection between the downrigger line and fishing line so that when the bait connected with the fishing line is taken by a fish, the fishing line will separate from the downrigger line to enable a fisherman to play and reel in the fish in a well known manner. The motor powered reel can pivot between an outboard fishing position, an idle position above a boat cover board or gunwale and an inboard position which enables the reel, motor and associated components of the downrigger to be attached to or removed from the boat. Power is supplied to the powered reel only when the downrigger is in the outboard fishing position. The powered downrigger unit includes a removable cover for the reel, motor and other drive components to prevent accidental contact with these components. Also, the downrigger line includes fiber optic observation of the underwater conditions at the trolling depth of the fishing line and lure attached thereto.

12 Claims, 6 Drawing Sheets

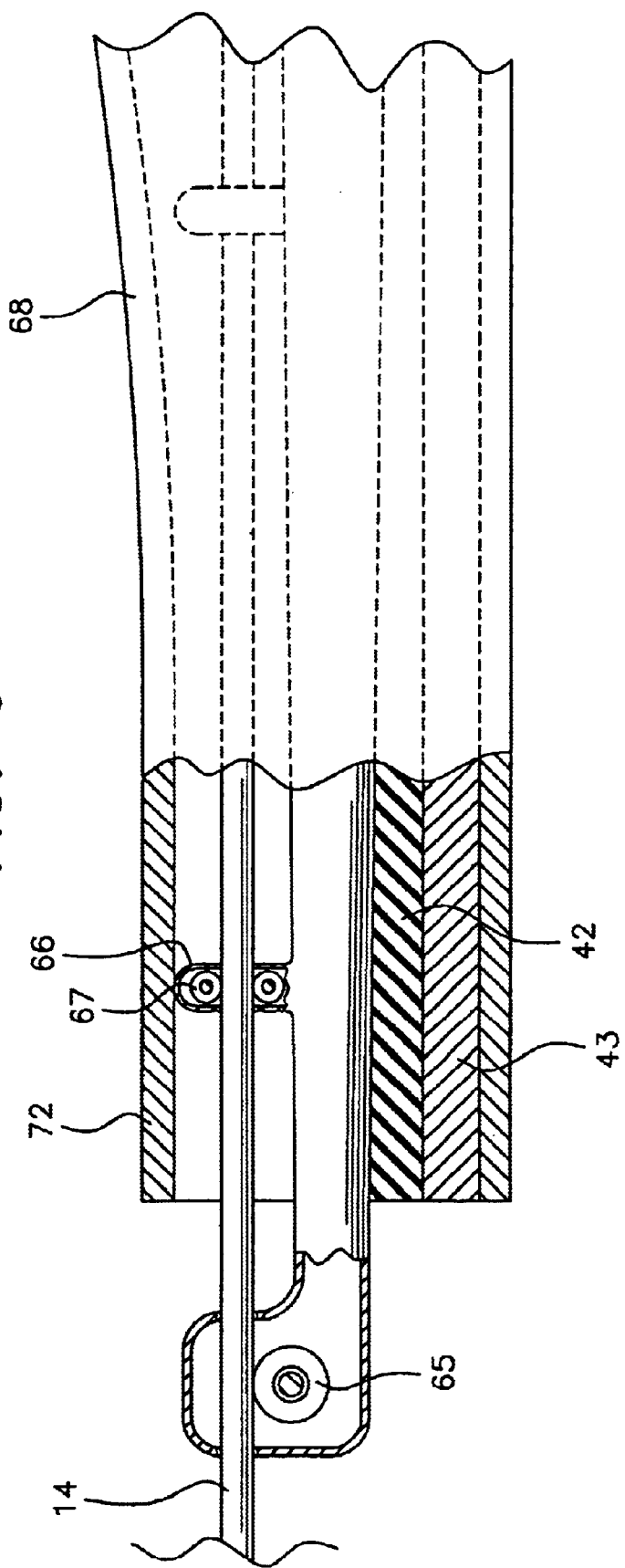

DOWNRIGGER

BACKGROUND OF THE INVENTION

1. Field of the Invention

The present invention generally relates to a downrigger including a downrigger line and weight connected thereto. The downrigger line is connected to a motor powered reel and is associated with a fishing line and fishing rod with a releasable interconnection between the downrigger line and fishing line such that when bait connected to the fishing line is taken by a fish, the fishing line will separate from the downrigger line to enable a fisherman to play and reel in the fish in a well known manner. The downrigger includes an electrically powered unit that can swivel from an outboard fishing position to an idle position above a boat cover board or gunwale and an inboard position with power being supplied to the powered reel only when the downrigger is in the outboard fishing position. The powered downrigger unit includes a removable cover for the reel, motor and other drive components to prevent accidental contact with these components. Also, the downrigger line includes fiber optic observation of the underwater conditions at the trolling depth of the fishing line and lure attached thereto.

2. Description of the Prior Art

A conventional downrigger fishing assembly includes a reel either manually or motor powered for the downrigger line which extends along a substantially rigid rod extending outboard of a boat and descends to a desired depth with the lower end of the downrigger line having a weight attached thereto. A fishing line connected with a fishing rod also extends downwardly into the water and is connected to the downrigger line or a trailing line extending from the weight by a releasable clip or catch in trailing relation to the downrigger line and weight. The downrigger line and weight are maintained at a predetermined depth depending upon the amount of downrigger line unwound from the reel and the forward speed of a fishing boat when trolling. When a fish takes the bait or lure on the terminal end of the fishing line, movement of the fish in an effort to dislodge the lure or bait will separate the fishing line from the downrigger line and weight thereby enabling a fisherman to play and land the fish in a conventional manner. The weight at the lower end of the downrigger line is preferably spherical or have other configurations and constructed of two pieces that are threaded together to maintain the lower end of the downrigger line at a desired depth when the fishing boat is moving forward at a predetermined speed.

SUMMARY OF THE INVENTION

The downrigger of the present invention includes a powered reel unit for a downrigger line including an elongated rod with guides thereon guiding movement of the downrigger line when the downrigger line is being reeled onto or unreeled from the reel. The powered downrigger reel and guide rod are pivotally and detachably supported from a boat structure for pivotal movement about a generally vertical axis in order for the downrigger reel and guide structure to be pivoted between a 45° outboard fishing position of the guide rod, an idle position in overlying relation to a portion of the supporting boat and a 45° inboard position to enable attachment and detachment of the powered reel unit and provide access to the guide rod and other components of the downrigger line. The pivotal support of the downrigger unit includes detent structures to lock the downrigger unit in outboard fishing and idle positions and includes power transmission structure to transmit electrical power to an electric motor powering the reel only when the downrigger guide structure is in an outboard fishing position. The downrigger also includes a removable cover that encloses all of the moving components of the reel and motor to prevent injury due to accidental contact with the power driven components of the downrigger. In addition, the downrigger line and weight include fiber optic capabilities and sensors to transmit underwater conditions to a receiver which provides a readout by which a fisherman can determine the underwater conditions at the location of the fishing lure on the fishing line.

It is an object of the present invention to provide a downrigger for trolling for fish at varying depths which includes an electrically powered reel for a downrigger line having a weight at a terminal end portion thereof. The downrigger is associated with a fishing rod and fishing line having a lure at the terminal end thereof with the lower end of the fishing line being detachably connected to the downrigger line or downrigger weight by a releasable clip for separation of the fishing line from the downrigger line or weight when a fish strikes the lure thereby enabling a fisherman to play and land the fish in a well known manner.

Another object of the invention is to provide a downrigger in accordance with the preceding object in which the powered reel on which the downrigger line is wound includes an elongated rigid guide member with the reel, motor and guide member being supported by a rotatable support base enabling the guide to be oriented in an outboard fishing position, an idle position overlying a coverboard or gunwale of a boat, or a position inboard of the boat.

A further object of the invention is to provide a downrigger in which the motor powered downrigger reel and guide for the downrigger line are provided with a protective cover removably connected to the base of the downrigger to prevent accidental injury due to contact with moving components of the downrigger and to enable access to such components by removing the cover.

Still another object of the invention is to provide a downrigger in accordance with the preceding objects in which the rotatable supporting base includes a pair of superimposed plates pivotally connected by a pin that enables an upper plate to be removably connected to a lower plate and to rotate in relation to a lower plate about a vertical axis defined by the pin with locating detents securing the upper and lower plates in angular relations to each other.

A still further object of the invention is to provide a downrigger in which the downrigger weight is constructed of a pair of threadedly connected members providing access to temperature and depth sensors encased therein which transmit information to a display unit which can be observed by a fisherman using the downrigger.

Yet another object of the invention is to provide a downrigger in accordance with the preceding object in which the rotating plates include electrical contact members connected to the motor for the reel and to an electrical supply source with said contacts being oriented to supply power to the electric motor for the downrigger reel only when the downrigger guide is oriented outboard of the boat hull in fishing position.

Yet another object of this invention to be specifically enumerated herein is to provide a downrigger in accordance with the preceding objects and which will conform to conventional forms of manufacture, be of simple construction and easy to use so as to provide a device that will be economically feasible, long lasting and relatively trouble free in operation.

BRIEF DESCRIPTION OF THE DRAWINGS

FIG. 6 is a detailed sectional view of the tip end of the downrigger unit illustrating the guide rollers associated with the guide member.

DESCRIPTION OF THE PREFERRED EMBODIMENT

Figure 1:
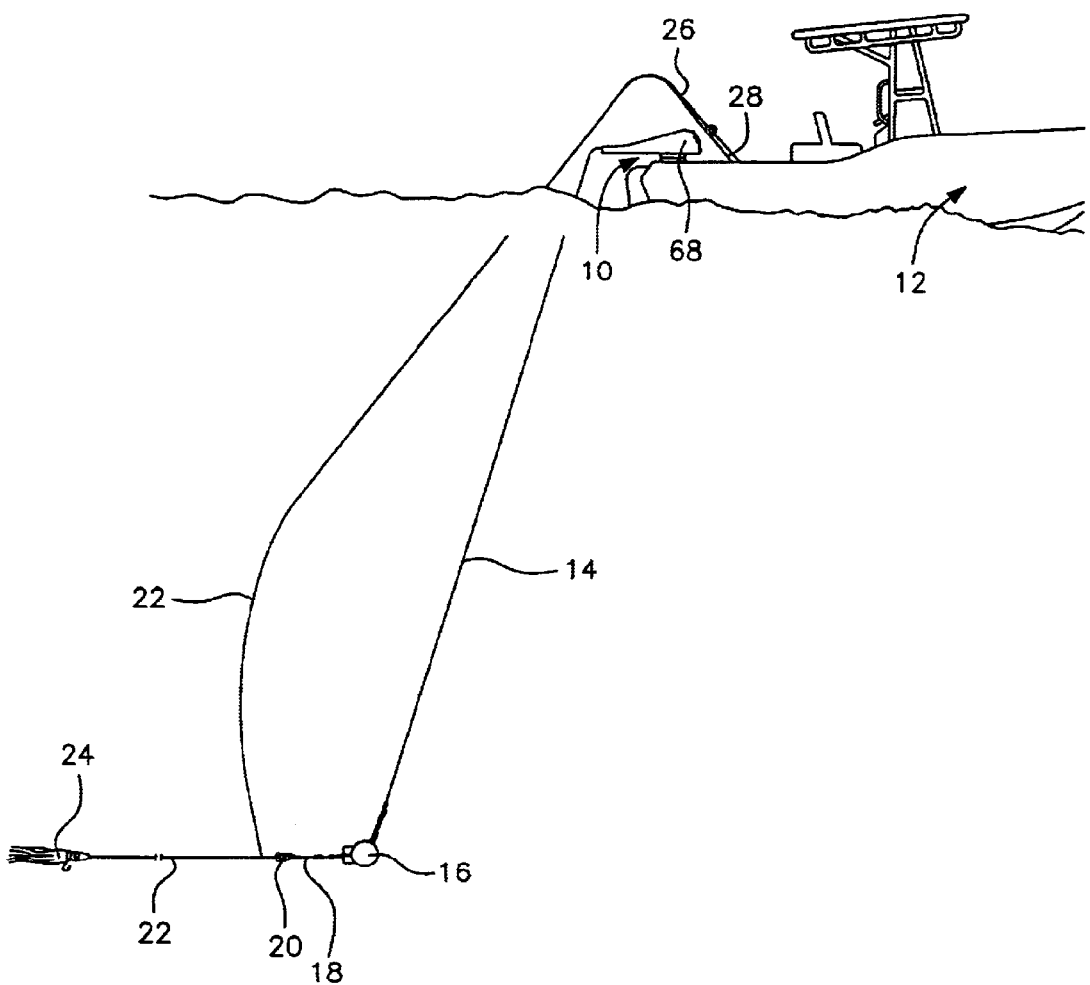
FIG. 1 is a schematic side elevational view illustrating a downrigger of the present invention and illustrating the association of the downrigger with a fishing boat and a fishing line.

Although only one preferred embodiment of the invention is explained in detail, it is to be understood that the invention is not limited in its scope to the details of construction and arrangement of components set forth in the following description or illustrated in the drawings. The invention is capable of other embodiments and of being practiced or carried out in various ways. Also, in describing the preferred embodiment, specific terminology will be resorted to for the sake of clarity. It is to be understood that each specific term includes all technical equivalents which operate in a similar manner to accomplish a similar purpose.

As illustrated schematically in FIG. 1 of the drawings, the downrigger unit of the present invention is generally designated by reference numeral 10 and is supported from a boat generally designated by numeral 12 adjacent the aft end thereof. The downrigger unit 10 is provided with a downrigger line 14 having a weight 16 connected to a lower end portion thereof in a well known manner. Extending from and attached to the downrigger weight 16 is a trailing line 18 having a release clip 20 thereon to which a fishing line 22 is detachably connected. The fishing line 22 extends in trailing relation to the clip 20 and terminates in a fish lure, bait or the like 24. The fishing line 22 is connected to a fishing rod 26 supported by a fishing rod holder 28. When trolling for fish, the downrigger line 14 is lowered with the weight 16 being towed by the downrigger line at a predetermined depth depending upon the weight, usually a ball weighing eight to ten pounds, and the forward speed of the boat. When a fish strikes the lure or takes the bait and exerts tension on the portion of the fishing line 22 between the release clip 20 and the lure 24, the release clip 20 releases the fishing line 22 so that the fisherman may utilize the fishing rod 26 to play and land the fish in a conventional manner. This assembly of components represents conventional downrigger structure except for the specific details of the downrigger unit 10 of the present invention.

The downrigger unit 10 is supported from a cover board 30 at the aft end of the boat or on a gunwale of the boat for pivotal movement about a vertical axis by a pair of overlying engaging circular plates 32 and 34 with the plate 32 being secured to the cover board or gunwale 30 by screw threaded fasteners 36 or equivalent securing devices. The plates 32 and 34 are pivotally interconnected by a vertical shaft or pin 38 affixed to plate 32. The pin 38 includes a lateral key 39 that passes through a keyway 35 in plate 34 when aligned therewith which occurs when the downrigger unit 10 is in an inboard position as illustrated in broken line in FIG. 4. The downrigger unit 10 can then be pivoted to an idle position illustrated in solid line in FIG. 4. This enables the downrigger unit 10 to be attached to or separated from the plate 34 when in the inboard position with pivotal movement of plate 32 locking the downrigger 10 to the board gunwale 30 as long as the key 39 on pin 38 is misaligned with keyway 35 in plate 32.

The upper plate 34 includes forwardly and rearwardly extending thin plates 40 forming a support for a supporting base 42 having a shape similar to plate 40 and being constructed of substantially rigid insulating material which may be hard rubber, plastic or the like. The portion 41 of the plate 40 and base 42 overlying the plates 32 and 34 are partially circular and the portion 43 extending toward the free end of the plate 40 and base 42 tapers to a relatively narrow end as illustrated in FIG. 3.

A reel or spool 46 is supported from plate 40 above plates 32 and 34. The downrigger line 14 is spirally wound on reel 46 which is supported rotatably by central reel shaft 48 supported by spaced support brackets 50 and 52 at opposite sides thereof. The shaft 48 extends beyond the bracket 50 and includes a gear 54 mounted thereon which is driven by a drive gear 56 in meshing engagement therewith. The drive gear 56 is driven by a twelve volt DC motor 58 having an output shaft 60 connected with the gear 56. The motor 58, shaft 60, gears 56 and 54 and a portion of the shaft 48 are enclosed within a housing 62. The gears 54 and 56 are miter gears or the gear 54 may be a pan gear and the gear 56 may be a pinion gear in meshing engagement therewith in order for the motor 58 to drive the shaft 48 and thus drive the reel 46 to wind the downrigger line 14 onto the reel. The weight of the ball weight 16 at the end of the downrigger line will unwind the downrigger line 14 by rotating the reel when the motor 58 is not powered or the motor 58 may be a reversible motor.

The downrigger line 14 is supported and guided by an elongated steel guide rod 64 located along the upper surface of the plate 40 with the downrigger line 14 extending through upstanding closed guides 66 mounted on the upper surface of the steel rod 64 with the guides 66 adjacent the reel 46 being taller than the guides 66 adjacent the outer end of the steel rod 64. Each of the guides 66 includes a pair of rollers 67 to facilitate relative movement of the downrigger line 14 in the guides 66. The specific construction of the guides enables the downrigger line reel 46 to feed the downrigger line tangentially from and onto the reel 46. The tip end of guide rod 64 is provided with an end roller 65 to guide and support the downrigger line 14 as it passes over the end of guide rod 64.

Figure 2:
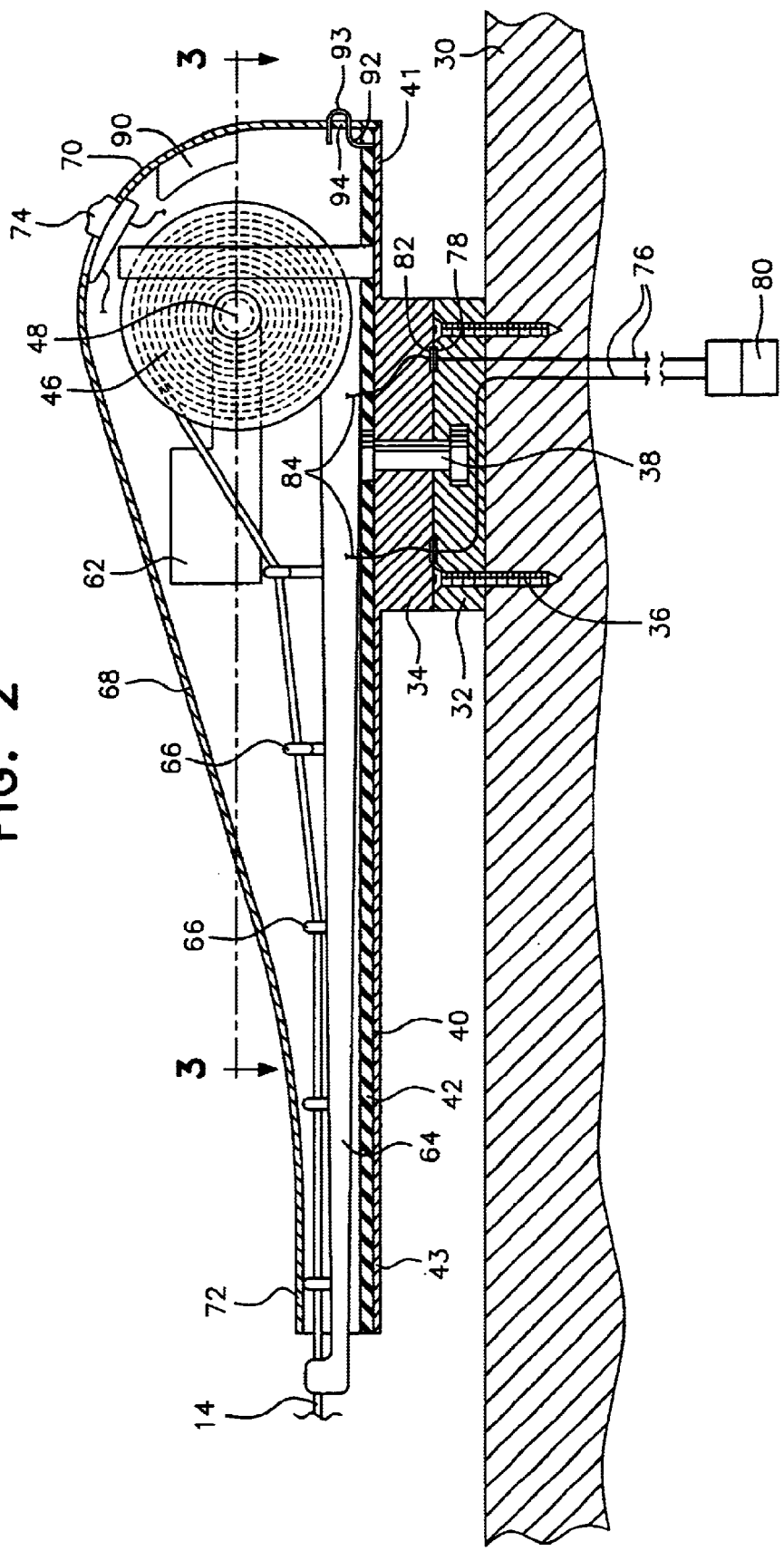
FIG. 2 is a longitudinal sectional view of the downrigger unit mounted on a boat structure illustrating the rotatable support, downrigger line reel, drive motor and guide structure for the downrigger line.
Figure 3:
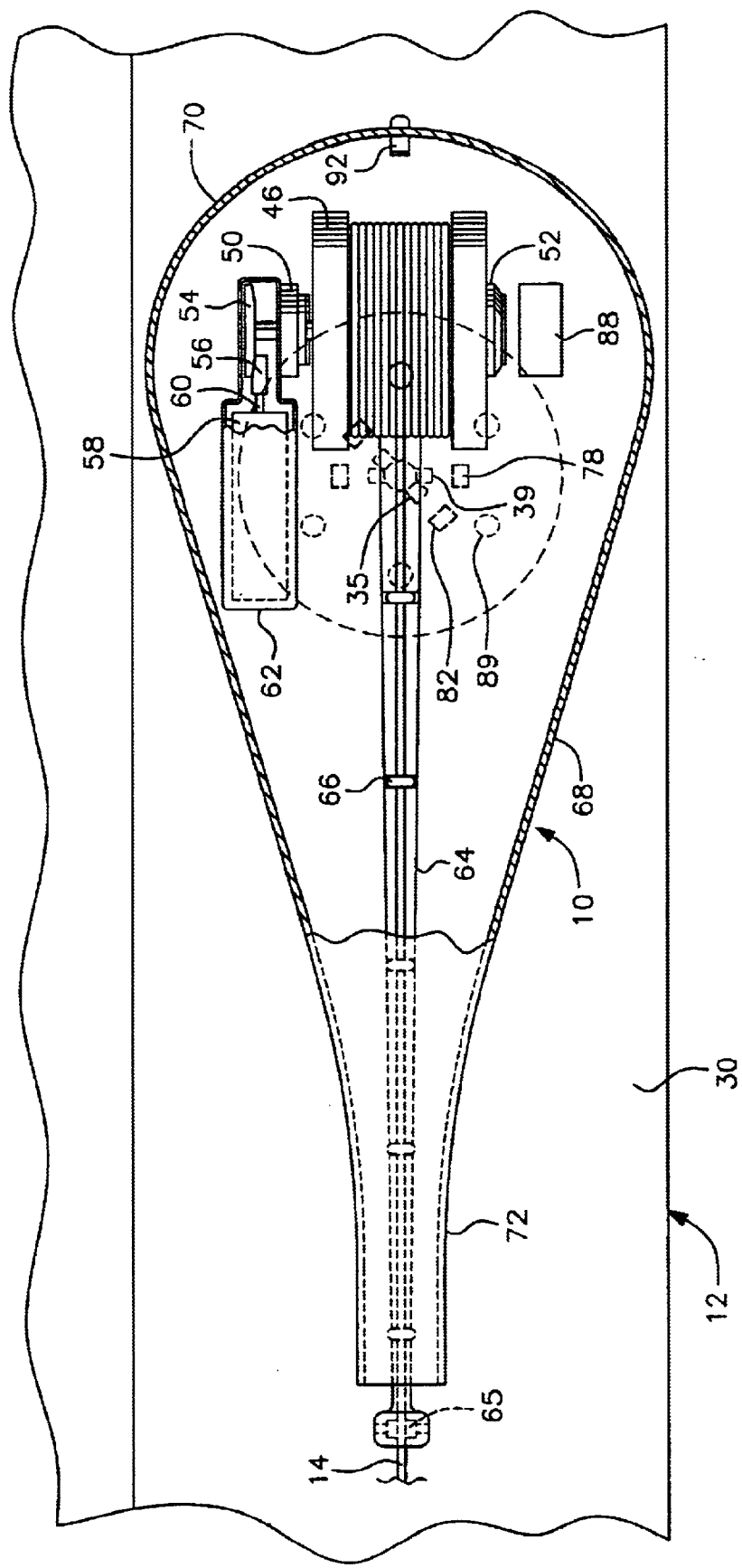
FIG. 3 is a top plan sectional view taken along section line 3—3 on FIG. 2 illustrating structural details of the drive motor, gear drive and downrigger line reel and guide structure.

Overlying and conforming generally with the configuration of the base 40 is a cover generally designated by reference numeral 68 which includes an inner end of generally semispherical configuration designated by reference numeral 70 and a tapering outer end 72 which encloses the guide rod 64, the guides 66 and the downrigger line 14 as illustrated in FIGS. 2 and 3. The cover 68 is removable and is preferably constructed of aluminum which may be anodized with various colors to provide an attractive enclosure for the moving components of the downrigger unit 10. The portion of the cover 68 as designated by numeral 70 includes a rocker switch 74 on an upper portion thereof. The rocker switch 74 energizes the motor to wind the downrigger line 14 onto the reel or energize the motor in a reverse direction to enable the reel to move in a direction to unwind the downrigger line 14 to a desired depth. The cover 68 may be easily removed by actuating a cover latch in the form of a spring member 92 mounted on the base 40 and including a projection 93 resiliently engaged with an opening 94 in the end of the cover 68 adjacent the lower edge of the inner end 70 of the cover 68 as illustrated in FIG. 2. Power is supplied to the motor 58 through the switch 74 by conductors 76 extending into and through the plate 32 and connected with arcuate contacts 78 in the upper face of the plate 32. The conductors 76 may extend to and connect to a circuit breaker panel 80 or any other source of electrical energy. The plate 34 also includes contacts 82 with conductors 84 extending from the contact members 82 to the motor 58 through switch 74.

As a safety measure, the contacts 78 and 82 only contact each other when the downrigger unit 10 is in an outboard fishing position in which the narrow end of the base 40 and cover 68 extend outwardly in a rearward direction from the gunwale of the boat generally in 45° relation to a center line of the boat hull so that the downrigger weight 16 will not come into contact with the hull of the boat when the downrigger weight is being lowered or lifted.

Figure 4:
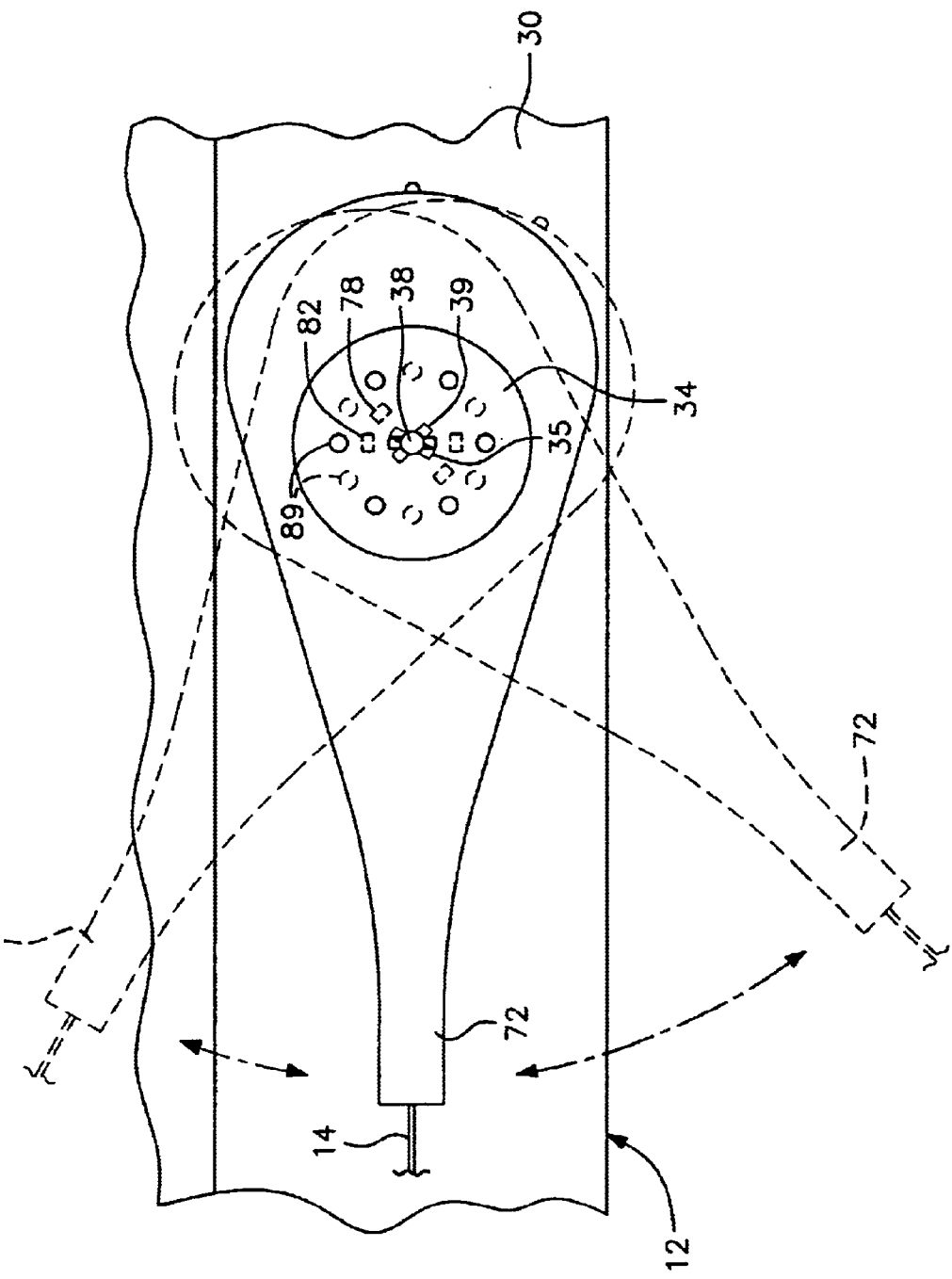
FIG. 4 is a schematic plan view illustrating the pivotal positions of the downrigger unit including locational detents and electrical contacts incorporated in the pivotal support for the unit.
Figure 5:
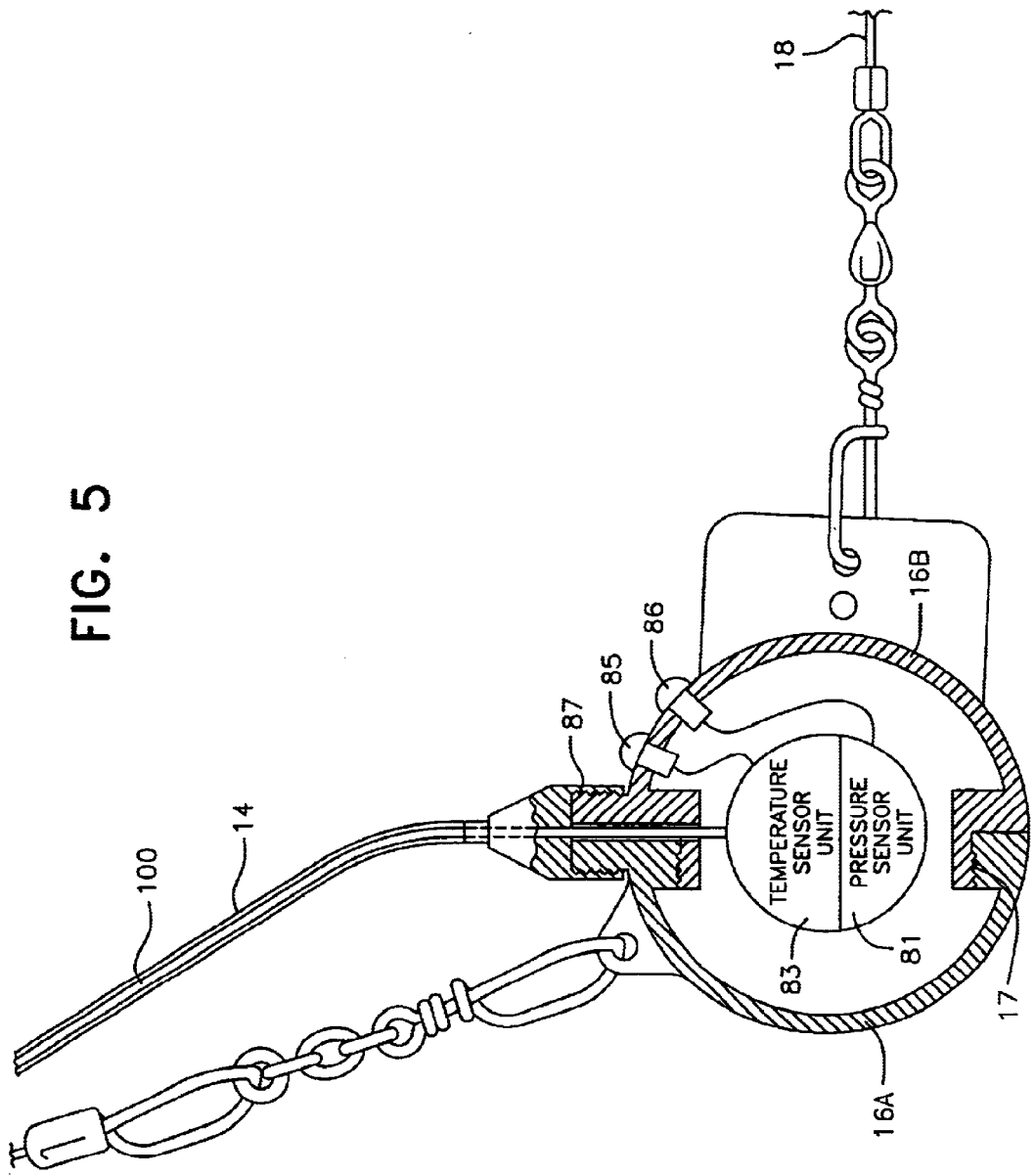
FIG. 5 is a sectional view of the downrigger weight illustrating the structural details thereof.

As shown in FIG. 4, the contacts 78 and 82 are arranged so that when the downrigger unit 10 is in a position parallel to the gunwale or if the unit 10 is moved so that the narrow end thereof is positioned interiorly of the gunwale of the boat, the contacts 78 and 82 do not engage each other. However, when the downrigger unit 10 is pivoted to the outboard position or the fishing position in which the narrow end of the unit extends outwardly generally in 45° relation to the center line of the boat, the contacts 78 and 82 are engaged to supply electrical energy to the motor when the momentary rocker switch 74 is actuated to raise or lower the downrigger line and downrigger weight.

Also, the two plates 32 and 34 include locator detents 89 including partially spherical recesses and a spherical projection engaged in the recesses to releasably secure the downrigger unit in its idle position parallel to the boat hull surface and the fishing position in a 45° outboard relation. When the downrigger unit is pivoted to an inboard position, the downrigger unit may be removed by lifting vertically when the key 39 on pin 38 is aligned with keyway 35 in plate 34.

The weight 16 is generally spherical and includes a pair of semispherical members 16A and 16B connected together by a screw threaded telescopic joint 17. The weight 16 encases temperature and pressure sensors 83 and 81 connected to temperature and pressure probes 85 and 86. The downrigger line 14 includes a fiber optic member 100 incorporated to transmit temperature and depth information regarding conditions at trolling depth of the lure 24. A connector 87 connects the downrigger line 14 with the weight 16 to provide connection of the fiber optic member with the sensors. The signals from sensors 83 and 81 is transmitted to a chip in a receiver 88 through a prism and subsequently to display unit 90 in cover 68 through a hard wire. This enables underwater conditions to be observed including the water temperature and depth of the downrigger weight and fishing lure or bait 24.

The downrigger unit 10 is of compact construction and the configuration of the cover 68 provides an attractive appearance to the device and also protects the components of the downrigger unit 10 from water spray, inclement weather and the like and also prevents boat occupants from possible injury by preventing contact with moving components of the downrigger unit. In one embodiment of the invention, the downrigger unit may have an overall length of 2 feet or less and an overall width and height of less than 1 foot. The gear drive and motor provide a DC power system connected with the DC power system of the boat and effectively and rapidly raises or lowers the downrigger line and weight upon momentary actuation of the switch to raise or lower the downrigger line and weight.

The capability of determining the temperature of the water and controlling the depth of the downrigger weight and fishing lure or bait enables the forward trolling speed to be varied to orient the bait and lure at an optimum depth with the sensors and fiber optics enabling conditions at trolling depth to be readily determined by observing the display unit in the downrigger unit.

The foregoing is considered as illustrative only of the principles of the invention. Further, since numerous modifications and changes will readily occur to those skilled in the art, it is not desired to limit the invention to the exact construction and operation shown and described, and, accordingly, all suitable modifications and equivalents may be resorted to, falling within the scope of the invention.

What is claimed as new is as follows:

1. A downrigger comprising:
    a support assembly adapted to be secured to a water craft, said support assembly including a base supported for pivotal movement about a generally vertical axis,
    an elongated support rod connect to said base,
    an elongated downrigger line guided along said rod,
    a downrigger weight supported by said downrigger line,
    a motor powered reel mounted on said base for winding and unwinding said downrigger line to vary the position of the downrigger weight in a body of water,
    a fishing rod and fishing line supported adjacent said base with the fishing line extending downwardly to a position adjacent said downrigger weight, said fishing line including a lure on a terminal end thereof,
    a releasable clip connecting a portion of the fishing line adjacent the terminal end thereof to said downrigger line and weight to maintain the lure on the fishing line at substantially the same depth as the downrigger weight, said releasable clip releasing the fishing line from the downrigger weight when the lure has a force exerted thereon by a caught fish thereby enabling a fisherman to manipulate the fishing rod and fishing line to play and land the caught fish,
    said support assembly including a pair of overlying plates connected together in a manner to enable a lower of the plates to be rigidly secured to a water craft and the upper of said plates being pivotal about a generally vertical axis, said plates including locational detents to secure the base and support rod guiding said downrigger line in various angular positions about a vertical axis with one of such positions being a fishing position in which an end of the base remote from the reel extends outboard of the hull of a water craft and another of such positions orienting the base and rod guidingly supporting said downrigger line in overlying relation to a portion of a water craft hull, said plates including electrical contacts with the contacts on the lower plate being connectable to an electrical supply system of a water craft and the contacts in the upper of said plates being connected to said motor powered reel through a switch, said contacts on said plates being arranged in arcuately spaced relation to each other when the base, rod and downrigger line guided by the rod are in overlying relation to a portion of a hull of a water craft and being in contact only when the base, rod and downrigger line guided by the rod are oriented in the fishing position with the end of the base remote from the reel and vertical axis of the plates being outboard of the hull of the water craft.

2. The downrigger as defined in claim 1, wherein said reel is driven by a reversible DC motor electrically connectable to the electrical system of a water craft through said switch to operate the motor in either direction to rotate the reel in either direction.

3. The downrigger as defined in claim 2, wherein said motor is connected to the reel through a reduction drive gear arrangement, said reduction drive gear arrangement includes meshed miter gears, said reduction drive gear arrangement is mounted on a shaft supported by brackets on said base, said reel being mounted on said shaft for rotation therewith.

4. The downrigger as defined in claim 1, wherein said base is provided with a cover enclosing the motor driven reel, support rod and that portion of the downrigger line extending from the end of the support rod to the reel.

5. The downrigger as defined in claim 4, wherein said support rod on the base includes a plurality of closed eye guides for guiding the downrigger line along said rod on said base.

6. The downrigger as defined in claim 5, wherein said cover and base include a separable latch enabling the cover to be removably connected to the base.

7. The downrigger as defined in claim 5, wherein each of said closed eye guides includes a guide roller guidingly engaging said downrigger line.

8. The downrigger as defined in claim 7, wherein said support rod includes a roller at its outer tip end to guide said downrigger line over an outer end of said support rod.

9. The downrigger as defined in claim 1, wherein said downrigger line includes a fiber optic element having a temperature and depth sensor at a terminal end thereof enclosed in said downrigger weight and connected to a receiver for providing information on a display unit regarding the water temperature and depth of the downrigger weight.

10. The downrigger as defined in claim 1, wherein said weight is a two piece ball enclosing a temperature sensor and a depth sensor.

11. The downrigger as defined in claim 10, wherein said two pieces are semispherical and threadedly connected together.

12. The downrigger as defined in claim 1, wherein said upper plate includes a pivotal connection to said lower plate, said upper and lower plates include mechanical interconnecting structure which enables attachment and detachment of said plates to enable assembly and disassembly of said downrigger in relation to a water craft hull.

* * * * *